Feb. 21, 1967  T. T. HIGHLEY, JR., ETAL  3,305,803
LOW THERMAL E.M.F. CONTACTOR
Filed April 2, 1965  2 Sheets-Sheet 1

INVENTORS
THOMAS T. HIGHLEY JR.
JAMES J HITT

BY
William D. Miller Jr.
AGENT

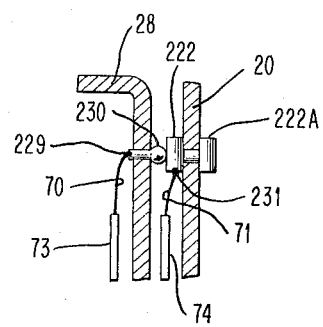
FIG. 2
FIG. 3
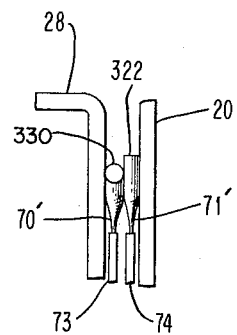

United States Patent Office 3,305,803
Patented Feb. 21, 1967

3,305,803
LOW THERMAL E.M.F. CONTACTOR
Thomas T. Highley, Jr., Philadelphia, and James J. Hitt, Willow Grove, Pa., assignors to Leeds & Northrup Company, a corporation of Pennsylvania
Filed Apr. 2, 1965, Ser. No. 445,126
24 Claims. (Cl. 335—97)

This invention relates to contacting devices and more particularly to synchronous converters of the vibratory-reed type in measurement apparatus for measuring D.C. potentials at very low levels, such as nanovolt levels.

Typically, contacting devices and particularly synchronous converters are constructed with their contact elements supported by cantilevered spring metal elements and the leadwire connections for the individual contact elements are usually made at the fixed end of the cantilevered supporting elements. Likewise, in the usual contacting device or converter construction the contact elements themselves are frequently of a noble metal alloy whereas the contact support elements are desirably of a different material because of the requirement that they have a resilient characteristic for proper operation of the device and for economy of construction. By virtue of the resulting dissimilarity between the contact element material and the supporting element material as well as the dissimilarity between the supporting material and the leadwire connected to it, there will be generated in the usual contact structure thermoelectric E.M.F.'s at the several junctions of dissimilar metals. These thermoelectric E.M.F.'s have a tendency to cancel when the junctions are all at the same temperature because of the symmetrical construction which is usually used. However, normal operation of devices such as converters involves the imposition of a thermal gradient upon the contact structure so that the various junctions are frequently not at the same temperature particularly when they are widely spaced, and in some cases over a particular period of operation of the device the temperature gradient may also change by a significant amount.

One use of this type of contacting device is as a converter in which the contact circuits are usually used in series particularly in measuring circuits when very low level measurements of direct current potentials are made. The thermoelectric E.M.F.'s which are generated by the dissimilar metal junctions and which are not balanced precisely by opposition E.M.F.'s of the same magnitude will in such cases show up in the measurement as an offset of the measured value from the true value. Those offsets will vary with changes in the thermal gradient over the converter structure causing an apparent drift in the signal being measured.

Considering converter structures in particular, they have in the past utilized heat sinks to attempt to equalize the temperature at the various parts of the converter structure or alternatively the power to the driving coil has been reduced in order to reduce the amount of heat dissipated within the converter casing. These approaches, in general, have not been sufficiently successful to make possible the use of the present converter structures in measurement circuits which work at low levels such as the nanovolt level.

It is therefore an object of this invention to provide an improved contacting device for low level circuits.

Another object of this invention is the provision of an improved synchronous converter for low level measurements.

A further object of this invention is to provide a contact circuit for a synchronous converter which is substantially free from offset voltages due to the thermoelectric property of the elements in the contact circuit.

A still further object of this invention is to provide a contact circuit for a synchronous converter which is substantially free from drift in the amount of offsetting voltage experienced due to the thermoelectric E.M.F.'s generated by elements in the contact circuit.

To accomplish these several objects the present invention provides for the leadwire which connects the converter contact circuits to external apparatus to be comprised of a metal which is similar thermoelectrically to the contact element itself and this leadwire is connected to the contact element itself either directly or by way of a very short path through a dissimilar metal. The very short path, if present, is preferably so oriented that it lies in an isothermal plane in the converter structure.

For a more detailed understanding of the invention reference is made to the drawings in which like elements have like reference characters and in which FIG. 1 is a front elevation view partly in cross section of a vibratory-reed converter with a preferred form of the novel structure;

FIG. 2 is a partial view of a modified form of the novel structure of FIG. 1;

FIG. 3 is a partial view of another modified form of the novel structure of FIG. 1.

Figure 1:
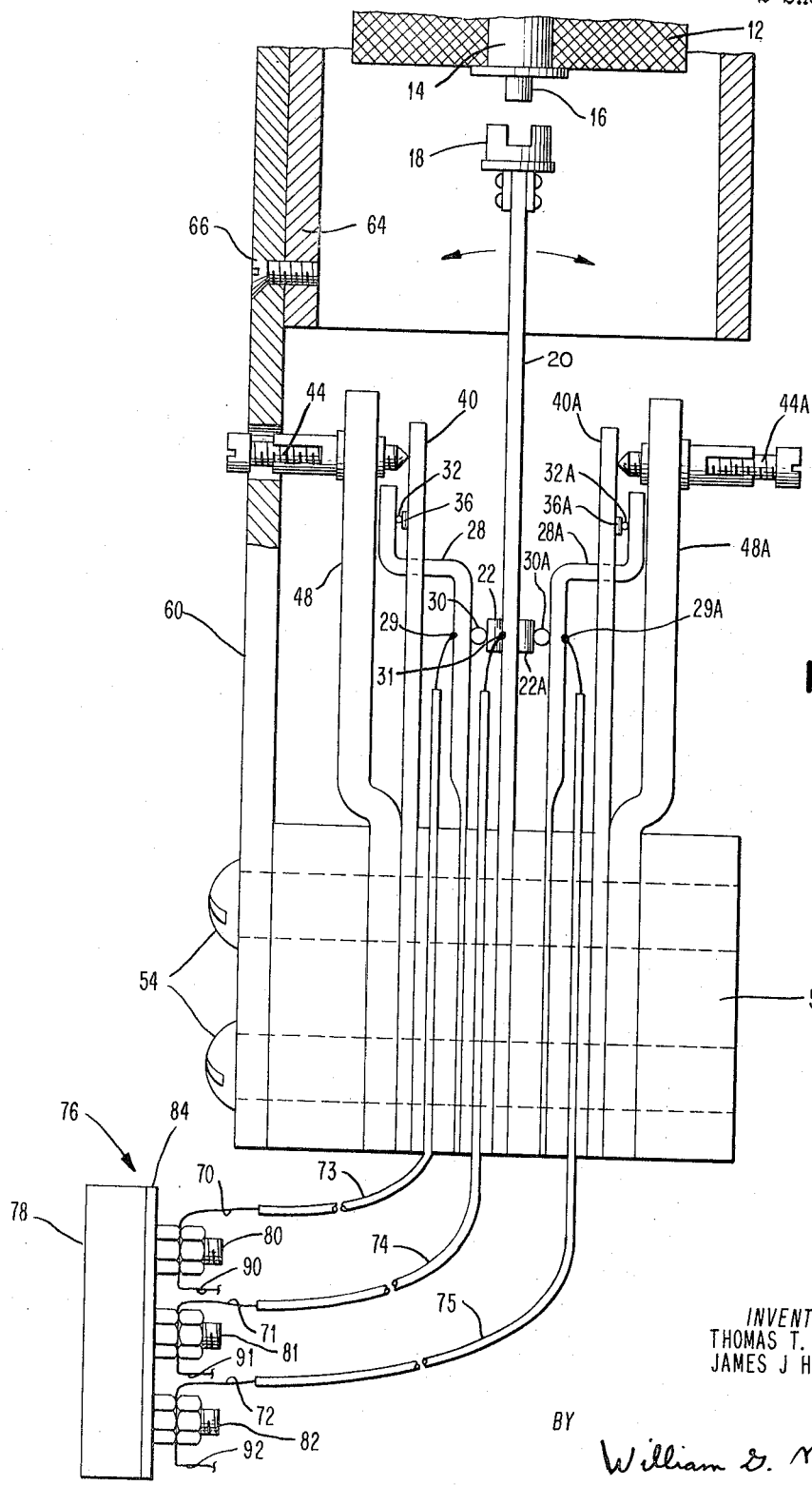

The invention is illustrated in one form by the vibratory-reed converter of FIG. 1 which has a construction similar to the converter fully disclosed in U.S. Patent 2,614,188 issued to A. J. Williams, Jr., and Raymond E. Tarpley on October 14, 1952.

In FIG. 1 the driving coil 12 is wound about a core 14 which has a pole 16 whose polarity will change in synchronism with an alternating or unidirectional pulsating current supplied to coil 12 from an external power source. Cooperating with the pole 16 is an armature member 18 which may be a permanent magnet having a U-shaped cross section as shown in FIG. 1. As the polarity at pole 16 alternates, force is exerted by pole 16 upon the armature 18 in opposite directions. Since the armature 18 is connected to a vibratory reed 20 as shown the changing polarity of pole 16 causes the reed 20 to vibrate from side to side.

The reed 20 is constructed of a thin strip of spring metal such as beryllium copper and is supported as a cantilever from a base stack 50. The reed 20 forms a supporting element for contact elements 22 and 22A. The contact elements 22 and 22A may, for example, be small cylindrical elements of a noble metal alloy such as a gold alloy to provide good contact characteristics. Thus, reed 20 and the contact elements 22 and 22A form a cantilevered contact structure with the reed being the supporting element and the elements 22 and 22A being the individual contact elements of that structure.

Other cooperating contact structures are positioned on opposing sides of the reed 20. The contact structure positioned to the left of reed 20 consists of a supporting element 28 which may also be a cantilevered strip of a resilient metal such as beryllium copper. The supporting element 28 carries a contact element 30 which like contact element 22 may be of a noble metal alloy such as gold alloy. The contact element 30 is oriented at right angles to contact element 22 and is so positioned that it comes in contact with contact element 22 when the reed 20 is not deflected to the right.

The supporting structure 28 also carries a contact element 32 which may be of a noble metal alloy or other suitable material for its purpose. The function of contact element 32, as will be described, is to determine the timing of the making and breaking of the contact elements 30 and 22. Both the contact elements 30 and 32 are shown as being of a cylindrical construction similar to that of contact element 22.

To provide an adjustable stop for the contact element 32 a mating contact element 36 oriented at right angles to contact element 32 is provided. Contact element 36 is mounted on a supporting strip of resilient metal, element 40, which is also cantilevered from the base stack 50. For the purpose of determining the timing of the making and breaking of contact elements 30 and 22 the resilient strip 40 is positioned by an adjustable screw 44 against which strip 40 is biased. Screw 44, as shown, is mounted in a rigid supporting strip 48 which has one end clamped in the base stack 50.

As shown in FIG. 1, the reed 20, the supporting element 28 and the supporting element 40 as well as the rigid support 48 are all fixed in position at one end by stack 50 with the elements 40, 28 and 20 being separated from one another in the stack by insulating wafers. The stack is held together, as shown in FIG. 1, by bolts 54 which extend through the stack.

The bolts 54 also hold a rigid supporting structure 60 which extends upwardly from the stack. Supporting structure 60 in turn supports coil housing 64 by means of the screw 66. The housing 64 is also of rigid material and is utilized to support coil 12 in its position above the other elements of the converter.

The contact structure to the left of the reed 20 has been described above. A similar contact structure shown to the right of reed 20 is essentially a mirror image of that shown to the left of reed 20. The elements to the right are identified by similar reference characters as those on the left with addition of an identifying "A" added. Thus, the contact element 22A is positioned to mate with a contact element 30A which is supported by a supporting element 28A. The supporting element 28A and the contact 30A making up a contact structure similar to that which is comprised of the elements 28 and 30 on the left. The supporting element 28A, likewise, has supported near its end another contact element 32A which serves to operate as a stop contact and cooperates with other elements in establishing the timing of the making and breaking of contact elements 22A and 30A.

Cooperating with the contact element 32A is an opposing contact element 36A which is supported by a support element 40A of resilient material. The positioning of element 40A is accomplished by the adjustment of the screw 44A against which element 40A is biased. Screw 44A is held in a rigid mounting 48A. As was described with regard to the elements on the left side of the reed 20 the elements 28A, 40A and 48A are all cantilevered with one end held in the stack 50. The elements 28A and 40A are separated by an insulating wafer as is the element 28A separated from the reed 20.

In order to connect the contact elements 22, 22A, 30 and 30A into an external circuit it is necessary to provide leadwires 70, 71 and 72. In accordance with this invention these leadwires should preferably be of a metal having the same thermoelectric characteristics as the contact elements 22, 22A, 30 and 30A with reference to the respective support elements 28, 20 and 28A. Thus, the leadwires 70, 71 and 72 may be of a noble metal alloy such as gold alloy. In the figure the leadwires 70, 71 and 72 are shown as leading to an external terminal block 76. Each leadwire has its respective insulating coverings 73, 74, and 75 to provide electrical insulation. These insulating coverings may, for example, be of a Teflon material such as a Teflon tubing. The insulating tubings are introduced into the converter by way of holes which allow them to pass through the insulating wafers of stack 50.

The leadwires 70, 71 and 72 are connected to their respective supporting elements 28, 20 and 28A, as by spot welding at points 29, 31 and 29A, very close to their respective contact elements 30, 22, 22A and 30A. The leadwires 70, 71 and 72 may be connected directly to the appropriate contact elements 30, 22 and 30A and another leadwire could be provided for contact element 22A as shown in FIG. 2 and described later, or alternatively the leadwires could be an integral part of the contact elements as shown in FIG. 3. However, it has been found to be adequate and more adaptable to mass production if the leadwires are connected very close to the contact elements and in an isothermal plane with the junctions between the several contact elements and their associated supporting elements. While in a construction of the latter type there is intervening material between the leadwires and the contact elements, such as the beryllium copper support element 28 between the gold alloy contact element 30 and the gold alloy leadwire 70; nevertheless, the positioning of the junctions between those dissimilar metals in a substantially isothermal plane and in very close spaced relationship prevents the development of any significant net thermoelectric E.M.F.'s between contact element 30 and leadwire 70. This results from the couple formed by the junction between elements 28 and 30 being at the same temperature as the couple formed by the junction between leadwire 70 and element 28.

Since the supporting element 28 is normally of very thin material, the thermal gradient which is possible across element 28, in a horizontal direction in the figure, would be very small. Thus, heat flow along a horizontal axis across the converter structure would not cause any significant net thermoelectric E.M.F.'s in the circuit between leadwire 70 and contact element 30.

In addition to the minimizing of the spacing between the individual junctions on each support element, all of the junctions internal to the converter are closely grouped by positioning them so that there is a minimum spaced relationship between them. Thus, the junction between leadwire 70 and support element 28 is desirably placed as close as possible to the junction between leadwire 72 and support element 28A. As mentioned previously, it is also desirable that all of the junctions be oriented in substantially the same isothermal plane relative to the internal heat source in the converter. By such an overall arrangement thermal E.M.F.'s due to the effects of external heat sources are minimized primarily by the close spacing while the thermal E.M.F.'s due to the effects of the internal heat sources such as coil 12, are minimized not only by the close spacing but also by the orientation of all of the junctions in an isothermal plane with respect to that internal source.

Since the heat from coil 12 flows mainly along reed 20 the isothermal planes referred to with respect to coil 12 will normally be oriented so as to extend across the converter structure at particular elevations. Thus, the dissimilar metal junctions when positioned as shown will tend to all lie in one of those planes. Some of the heat from coil 12 is also conducted through the rigid structural element 60, through the stack 50 and up through supporting element 28 and 28A and reed 20. This heat flow will also tend to cause the junctions to be at points of equal temperature because of the general symmetry of the converter structure.

It will be evident to those skilled in the art that the junctions between the leadwires 70, 71 and 72 and the external circuitry should also be made with a construction which will minimize the possibility of the generation of thermal E.M.F.'s. This can be done by using relatively long lengths for leadwires 70, 71 and 72, to avoid temperature differences at the external junctions due to heat flow along the leadwires, and by placing these external junctions at the same temperature by close spacing and other thermal equalization means.

In order to minimize these thermal E.M.F.'s in the junctions between the leadwires 70, 71 and 72 and the external circuitry, which generally utilizes copper wire, care must be taken in the design of terminal block 76. In the structure shown in the figure terminal block 76 has a base portion 78 of heat conducting metal. Individual terminal posts 80, 81 and 82 are mounted on a thin strip of electrically insulating material 84 which is in turn mounted on base 78. By virtue of the thermal equalizing effect of the base 78 all of the terminal posts 80, 81 and 82 are maintained at substantially the same temperature. Therefore, the junctions between the gold alloy leadwires 70, 71 and 72 and the respective copper wires 90, 91 and 92 from the external circuit, produce thermal E.M.F.'s of equal magnitude. In the use of the converter in measuring instruments the circuit will always have two such junctions and the thermal E.M.F.'s will then cancel so that they produce no net effect on the values being measured by the instrument.

FIG. 2 shows one possible structural arrangement for a portion of the converter of FIG. 1 which provides for a direct connection of the leadwires to their associated contact elements. Only a portion of one side of the converter is shown. The other side would normally have a similar construction.

As shown in FIG. 2 contact element 230, which may be of gold alloy replacing contact element 30 of FIG. 1, extends through the support element 28 so that a gold alloy leadwire 70 can be connected directly to the contact element itself as by a spot weld 229.

Similarly the gold alloy contact element 222 is shown in FIG. 2 as being an integral part with contact element 222A. Both contact elements 222 and 222A are then directly connected to the gold alloy leadwire 71 by spot weld 231. This structure therefore eliminates the beryllium copper of the support elements 28 and 20 from the circuit between leadwires 70 and 71 and therefore would further minimize the thermoelectric potentials which could be developed in that circuit.

In FIG. 3, a structure which would provide a still further minimizing of the net thermoelectric E.M.F.'s is shown. This structure includes gold alloy contact elements 330 and 322 which replace the contact elements 30 and 22 of FIG. 1. Contact elements 330 and 322 are both shown as being mounted on their respective support elements 28 and 20. The elements themselves are constructed to be integral with their respective leadwires 70' and 71'. This can be accomplished by drawing the metal of the contact element out at one end so as to form a wire-like extension of the contact element. Such a structure would avoid as much as possible the creation of a net thermoelectric E.M.F. in the circuit between leadwires 70' and 71', for it would make that circuit one which does not include any physical junction between dissimilar metals or metallurgical changes in the circuit materials themselves such as might also be sources of thermoelectric E.M.F.'s.

The contact elements and the leadwires of FIGS. 2 and 3 can, of course, be of any other material desired as long as care is taken to choose materials which will not introduce any substantial net thermoelectric potentials in the circuits of the contact elements and the associated external circuitry.

Tests made with a construction like that in FIG. 1 have shown at least a 20 to 1 reduction in offset voltages as compared with the usual construction in which the leadwire is connected to the fixed ends of the supporting elements of the contact structures. Reductions in the drift rate of greater than 20 to 1 have also been obtained.

It will be evident that the disclosed novel structure can be used in any of a number of electrical contacting devices, such as switches, when it is imperative that the thermal E.M.F.'s be minimized. It will also be evident that the disclosed structure can be utilized when it is desirable to change some design aspect of the normal structure while obtaining performance on a level commensurate with that previously obtained in units not utilizing the present invention. For example, it may be desirable to make the support elements 28, 20 and 28A of a material which has a different spring characteristic than beryllium copper without establishing in circuit with the associated contact elements thermoelectric potentials greater than those experienced in the previously known structures. Likewise, a freedom of selection as to the material of the contact elements is possible when utilizing the present invention. Also, higher power dissipation in the driving coil 12 can be tolerated while operating within previously obtained performance levels.

What is claimed is:

1. A synchronous converter comprising
a driving coil energized by a source of pulsating current,
a reed having armature structure actuated by said coil for vibration in synchronism with said current pulsations,
a first contact element of a particular metal supported by said reed
a second contact of a similar metal supported by a cantilevered resilient support element of a dissimilar metal so as to alternately contact and disengage said second contact element and said first contact element as said reed vibrates,
a first leadwire of said particular metal connected to establish a circuit with said first contact element, said connection being made in close proximity to said first contact element, and
a second leadwire of said particular metal connected to establish a circuit with said second contact element, said last named connection being made in close proximity to said second contact element and in a plane which is isothermal with respect to the point of connection between said first leadwire and said first contact element.

2. A synchronous converter comprising
a driving coil energized by a source of pulsating current,
a reed of spring material having an armature structure actuated by said coil for vibration in synchronism with said current pulsations,
a first contact element of gold alloy supported by said reed,
a second contact of gold alloy supported by a cantilevered resilient support element of spring material so that said first contact element alternately contacts and disengages with said second contact element as said reed vibrates,
a first leadwire of gold alloy connected to establish a circuit with said first contact element, said connection being made to said reed at a point in close proximity to said first contact element and in a plane isothermal to the area of contact between said first contact element and said reed with respect to the heat dissipated by said coil, and
a second leadwire of gold alloy connected to establish a circuit with said second contact element, said last named connection being made to said support element at a point in close proximity to said second contact element and in a plane which is isothermal to the area of contact between said second contact element and said support element with respect to said coil.

3. A synchronous converter comprising
   a vibratory reed,
   means for vibrating said reed at a particular frequency,
   a first and second contact element fabricated from a particular metal and mounted on opposite sides of said reed,
   a third and fourth contact element also fabricated of said particular metal, each of said third and fourth elements being mounted on a separate cantilevered support element and positioned so that said first contact element engages said third contact element while said reed is deflected in one direction and so that said second contact element engages said fourth contact element while said reed is deflected in another direction,
   a first leadwire for making a connection to said first and second contact elements, said first leadwire being of a metal having similar thermoelectric characteristics with said particular metal of said first and second contact elements and being electrically connected to said first and second contact elements over a short path in said reed, and
   a second and third leadwire for making a connection to said third and fourth contact elements respectively, said second and third leadwires being of a metal having similar thermoelectric characteristics with the said particular metal of said third and fourth contact elements and being connected respectively to said third and fourth contact elements by short paths in said support elements.

4. A synchronous converter comprising
   a vibratory reed,
   means for vibrating said reed at a particular frequency,
   a first and second contact element fabricated from a particular metal and mounted on opposite sides of said reed,
   a third and fourth contact element also fabricated of said particular metal, each of said third and fourth elements being mounted on a separate cantilevered support element and positioned so that said first contact element engages said third contact element while said reed is deflected in one direction and so that said second contact element engages said fourth contact element while said reed is deflected in another direction,
   a first leadwire for making a connection to said first and second contact elements, said first leadwire being of a metal having similar thermoelectric characteristics with said particular metal of said first and second contact elements and being electrically connected to said first and second contact elements over a short path in said reed, and
   a second and third leadwire for making a connection to said third and fourth contact elements respectively, said second and third leadwires being of a metal having similar thermoelectric characteristics with the said particular metal of said third and fourth contact elements and being connected respectively to said third and fourth contact elements by short paths in said support elements, said last named short paths being in an isothermal plane with the said short path in said reed.

5. A synchronous converter as set forth in claim 4 in which said isothermal plane is isothermal with respect to the heat dissipated by said means for vibrating said reed.

6. A synchronous converter as set forth in claim 5 in which said contact elements and the ends of said leadwires connecting to said elements are closely grouped to provide a minimum spaced relationship between them.

7. A synchronous converter as set forth in claim 6 in which said leadwires are sufficiently long to avoid any substantial heat transfer from those ends connected to said contact elements to the other ends thereof.

8. A device for switching electrical current in low level circuits comprising
   a first and second resilient metal support element, said support elements each having one end fixed to form spaced cantilevers of said support elements,
   a contact element mounted on each of said support elements at a point spaced from said fixed ends, said contact elements being of a metal different from said support elements, and
   a separate leadwire connected in circuit with each of said contact elements at points in close isothermal relationship to said contact elements, said leadwire being of a metal having substantially the same thermoelectric characteristic with respect to the metal of said support elements as that of the metal of said contact elements.

9. A device for switching electrical current in a low level circuit comprising
   a first and second resilient support element, said support elements each having a fixed end,
   a contact element of a particular metal mounted on each of said support elements at a point spaced from said fixed end so that said contact elements contact each other upon deflection of one of said support elements to complete an electric circuit therebetween,
   a leadwire for each of said contact elements, said leadwire being of a metal having a similar thermoelectric characteristic as said contact elements, and
   means connecting each of said leadwires to a different one of the structures which include one of said contact elements and one of said support elements, said connection being so placed as to minimize the length of the circuit path through said support elements between said individual leadwires and the associated contact elements.

10. In an electrical contacting apparatus having a first and second contact structure and in which said first contact structure includes a contact element and a supporting element of dissimilar metals,
    means for substantially eliminating in the circuit completed by said contacting apparatus thermoelectric E.M.F.'s due to said dissimilarity comprising
    a leadwire of metal having similar thermoelectric characteristics with the metal of said contact element, said leadwire being connected at one end to said contact structure in close proximity to said contact element and having a length sufficient to avoid significant temperature changes at its other end due to heat flow in said leadwire so that the net thermoelectric E.M.F. in said circuit is substantially zero.

11. An electrical contacting apparatus as set forth in claim 10 in which said one end of said leadwire is connected directly to said contact element.

12. An electrical contacting apparatus as set forth in claim 10 in which said leadwire is an integral part of said contact element.

13. A synchronous converter comprising
    a driving coil energized by a source of pulsating current,
    a reed having armature structure actuated by said coil for vibration in synchronism with said pulsating current,
    a first contact element of a particular metal supported by said reed,
    a second contact of a similar metal supported by a cantilevered resilient support element of a dissimilar metal so as to alternately contact and disengage said second contact element and said first contact element as said reed vibrates,
    a first leadwire of said particular metal alloy connected to establish a circuit with said first contact element at one end and with an external circuit at the other end, said connection at said one end being made in close proximity to said first contact element and said connection at said other end being made at a point distant from said one end along said first leadwire, and a second leadwire of said particular metal alloy connected to establish a circuit with said second contact element at one end and with said external circuit at the other end, said connection at said one end being made in close proximity to said second contact element and in a plane which is isothermal with respect to the point of connection between said first leadwire and said first contact element, said first and second leadwires each being of sufficient length so that the heat transfer from said one end to said other end is not sufficient in magnitude to establish differing thermal E.M.F.'s at said other ends.

14. A device for switching electrical current in a low level circuit comprising
a first and second resilient support element, said support elements each having a fixed end,
a contact element of a particular metal mounted on each of said support elements at a point spaced from said fixed end so that said contact elements contact each other upon deflection of one of said support elements to complete an electric circuit therebetween,
a leadwire for each of said contact elements, said leadwire being of a metal having a similar thermoelectric characteristic as said contact elements, and
means connecting each of said leadwires directly to a different one of said contact elements.

15. A device for switching electrical current in a low level circuit comprising
a first and second resilient support element, said support elements each having a fixed end,
a contact element of a particular metal mounted on each of said support elements at a point spaced from said fixed end so that said contact elements contact each other upon deflection of one of said support elements to complete an electric circuit therebetween, and
a leadwire for each of said contact elements, said leadwire being an integral part of the respective ones of said contact elements.

16. A synchronous converter comprising
a vibratory reed,
means for vibrating said reed at a particular frequency,
a first and second contact element fabricated from a particular metal and mounted on opposite sides of said reed,
a third and fourth contact element also fabricated of said particular metal, each of said third and fourth elements being mounted on a separate cantilevered support element and positioned so that said first contact element engages said third contact element while said reed is deflected in one direction and so that said second contact element engages said fourth contact element while said reed is deflected in another direction,
a first leadwire for making a connection directly to said first and second contact elements, said first leadwire being of a metal having similar thermoelectric characteristics with said particular metal of said first and second contact elements, and
a second and third leadwire for making a connection directly to said third and fourth contact elements respectively, said second and third leadwires being of a metal having similar thermoelectric characteristics with the said particular metal of said third and fourth contact elements.

17. A synchronous converter comprising
a vibratory reed,
means for vibrating said reed at a particular frequency,
a first contact element fabricated from a particular metal and mounted on said reed,
a second contact element also fabricated of said particular metal, said second contact element being mounted on a separate cantilevered support element and positioned so that said first contact element engages said second contact element while said reed is deflected in one direction,
a first leadwire formed as an integral part of said contact element, said first leadwire being of said particular metal, and
a second leadwire formed as an integral part of said second contact element, said second leadwire being of said particular metal.

18. A synchronous converter comprising
a driving coil energized by a source of pulsating current,
a reed having armature structure actuated by said coil for vibration in synchronism with said current pulsations,
a first contact element of a particular metal supported by said reed,
a second contact of similar metal supported by a cantilevered resilient support element of a dissimilar metal so as to alternately contact and disengage said second contact element and said first contact element as said reed vibrates,
a first leadwire of said particular metal alloy connected to establish a circuit with said first contact element, said connection being made directly to said first contact element, and
a second leadwire of said particular metal connected to establish a circuit with said second contact element, said last named connection being made directly to said second contact element and in a plane which is isothermal with respect to the point of connection between said first leadwire and said first contact element.

19. A synchronous converter comprising
a driving coil energized by a source of pulsating current,
a reed having armature structure actuated by said coil for vibration in synchronism with said current pulsations,
a first contact element supported by said reed, said first contact element having a first leadwire drawn from the body thereof so as to form an integral part with said body, and
a second contact supported by a cantilevered resilient support element so as to alternately contact and disengage said second contact element and said first contact element as said reed vibrates, said second contact element having a second leadwire drawn from the body thereof so as to form an integral part with said body.

20. An electrical contacting apparatus for switching low level circuits without introducing significant thermoelectric E.M.F.'s comprising
a first contact structure having a contact element and a supporting element of dissimilar metals,
a second contact strucutre for establishing electrical contact with said first contact structure, and
a leadwire of metal having similar thermoelectric characteristics with the metal of said contact element, said leadwire being connected to said first contact structure in such close proximity to said contact element that the net thermoelectric E.M.F. in the circuit formed by said contact structures is substantially zero.

21. An electrical contacting apparatus as set forth in claim 20 in which said leadwire is connected to the supporting element of said first contact structure at a point in an isothermal plane with the junction between said contact element and said supporting element.

22. An electrical contacting apparatus as set forth in claim 20 in which said second contact structure includes a contact element and a supporting element of dissimilar metals and in which a separate leadwire of metal having similar thermoelectric characteristics with the metal of said contact element of said second contact structure is electrically connected to said second contact structure at a point close to the associated contact element.

23. An electrical contacting apparatus as set forth in claim 22 in which the separate leadwires for each of said contact structures are connected to the respective supporting elements at points each of which is in an isothermal plane with the junction between the corresponding supporting element and contact element.

24. An electrical contacting apparatus as set forth in claim 22 in which said leadwires have a length sufficient to avoid heat transfer to the junctions of said leadwire with an external portion of said circuit.

References Cited by the Examiner

UNITED STATES PATENTS 2,614,188   10/1952   Williams et al. ____ 200—90 X

OTHER REFERENCES

Komolibus, E. D.C./A.C. Converters for D.C. Amplifiers. British Scientific Instrument Research Association. 1961, page 6.

References Cited by the Applicant

UNITED STATES PATENTS 2,636,094   4/1953   Russell.
2,677,093   4/1954   Maltby.

BERNARD A. GILHEANY, *Primary Examiner.*

R. N. ENVALL, Jr., *Assistant Examiner.*